United States Patent
Kim et al.

(10) Patent No.: US 8,459,616 B2
(45) Date of Patent: Jun. 11, 2013

(54) AIR CLEANING HUMIDIFIER AND DISC ASSEMBLY THEREOF

(75) Inventors: Jung Ho Kim, Suwon-si (KR); Jun Eul Chang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 355 days.

(21) Appl. No.: 12/923,651

(22) Filed: Sep. 30, 2010

(65) Prior Publication Data

US 2011/0084415 A1  Apr. 14, 2011

(30) Foreign Application Priority Data

Oct. 12, 2009  (KR) .................. 10-2009-0096646

(51) Int. Cl.
*B01F 3/04*  (2006.01)
(52) U.S. Cl.
USPC ............................................. 261/30; 261/92
(58) Field of Classification Search
USPC ........................................ 261/28, 30, 91, 92
See application file for complete search history.

(56) References Cited

U.S. PATENT DOCUMENTS

| | | | | |
|---|---|---|---|---|
| 838,712 | A * | 12/1906 | Hersey ............................ | 261/92 |
| 1,778,571 | A * | 10/1930 | Stratton ........................ | 261/83 |
| 2,253,418 | A * | 8/1941 | Crandall et al. ................ | 261/92 |
| 3,171,600 | A * | 3/1965 | Eckey ............................ | 239/220 |
| 3,904,525 | A * | 9/1975 | Rosenberg ..................... | 210/150 |
| 4,267,051 | A * | 5/1981 | Uhlmann ...................... | 210/619 |
| 4,330,408 | A * | 5/1982 | McClure ....................... | 210/619 |
| 4,345,997 | A * | 8/1982 | McConnell, Jr. et al. ..... | 210/150 |
| 4,399,031 | A * | 8/1983 | Imano et al. .................. | 210/150 |
| 5,795,505 | A * | 8/1998 | Burns ............................ | 261/92 |
| 5,948,326 | A * | 9/1999 | Pate ............................... | 261/91 |
| 6,010,559 | A * | 1/2000 | Morgan ......................... | 95/218 |

FOREIGN PATENT DOCUMENTS

| | | |
|---|---|---|
| JP | 2009-014323 | 1/2009 |
| KR | 1998-064318 | 11/1998 |

* cited by examiner

*Primary Examiner* — Charles Bushey
(74) *Attorney, Agent, or Firm* — Staas & Halsey LLP

(57) ABSTRACT

Disclosed herein is an air cleaning humidifier having a disc assembly performing a purifying function and a humidifying function of indoor air, and a disc assembly thereof. The air cleaning humidifier includes a main body, a tub provided in the main body, an air blower fan generating an air current in the tub, and a rotatable disc assembly having a part of the disc assembly being disposed in the tub, and including a plurality of stacked discs, each of at least two of the discs including a body, a plurality of assembly parts defined through a surface of the body, first protrusion parts protruded from one surface of the body, and second protrusion parts protruded from the other surface of the body, the body being divided into a plurality of sectors by the plurality of assembly parts, and the first protrusion parts and the second protrusion parts being alternately formed in even-numbered regions, into which each of the plurality of sectors is divided.

24 Claims, 13 Drawing Sheets

AIR CLEANING HUMIDIFIER AND DISC ASSEMBLY THEREOF

CROSS-REFERENCE TO RELATED APPLICATIONS

This application claims the benefit of Korean Patent Application No. 2009-0096646, filed on Oct. 12, 2009 in the Korean Intellectual Property Office, the disclosure of which is incorporated herein by reference.

BACKGROUND

1. Field

Embodiments of the present invention relate to an air cleaning humidifier having a disc assembly to perform a purifying function and a humidifying function of indoor air, and a disc assembly thereof.

2. Description of the Related Art

In general, humidifiers are used to maintain indoor humidity at a proper level and prevent various respiratory diseases.

Humidifiers are operated by various humidifying methods. Among humidifiers operated by various humidifying methods, an evaporative type humidifier having a disc assembly, in which air purified by an air purification filter is discharged to the outside through discharge holes via a disc assembly soaked in water to achieve humidification, has recently been proposed.

Such a disc assembly is assembled by stacking several discs at regular intervals. However, since directionality needs to be considered during assembly, the disc assembly is inconvenient to be assembled.

SUMMARY

Therefore, it is one aspect of at least one embodiment to provide an air cleaning humidifier, in which a disc assembly is easily assembled by stacking, and a disc assembly thereof.

Additional aspects of the at least one embodiment will be set forth in part in the description which follows and, in part, will be obvious from the description, or may be learned by practice of the invention.

The foregoing and/or other aspects are achieved by providing an air cleaning humidifier including a main body, a tub provided in the main body, an air blower fan generating an air current in the tub, and a disc assembly rotated under the condition that a part of the disc assembly is disposed in the tub, and including a plurality of stacked discs, wherein each of at least two of the discs includes a body, a plurality of assembly parts defined through a surface of the disc body, first protrusion parts protruded from one surface of the disc body, and second protrusion parts protruded from the other surface of the disc body, the disc body is divided into a plurality of sectors by the plurality of assembly parts, and the first protrusion parts and the second protrusion parts is alternately formed in regions, into which each of the plurality of sectors is divided.

The plurality of sectors may be disposed at the same angle.

The plurality of regions may have the same size.

The one surface of the disc body and the other surface of the disc body may be surfaces of the disc body in opposite directions.

The disc body may include a ring part, which is ring-shaped.

The assembly parts may include a first assembly part, a second assembly part, a third assembly part, and a fourth assembly part, which are successively disposed at an angle of approximately 90 degrees, the sectors may include a first sector formed between the first assembly part and the second assembly part, a second sector formed between the second assembly part and the third assembly part, a third sector formed between the third assembly part and the fourth assembly part, and a fourth sector formed between the first assembly part and the fourth assembly part, and each of the first to fourth sectors may be divided into a first region having the first protrusion part and a second region having the second protrusion part.

The assembly parts may include a first assembly part, a second assembly part, and a third assembly part, which are successively disposed at an angle of approximately 120 degrees, the sectors may include a first sector formed between the first assembly part and the second assembly part, a second sector formed between the second assembly part and the third assembly part, and a third sector formed between the third assembly part and the first assembly part, and each of the first to third sectors may be divided into a first region having the first protrusion part and a second region having the second protrusion part.

Sizes of the first region and the second region of the first sector may be the same as those of the first region and the second region of each of the second to fourth sectors.

Sizes of the first region and the second region of the first sector may be the same as those of the first region and the second region of each of the second and fourth sectors.

The disc assembly may further include a first plate member and a second plate member disposed at both sides of the discs, and at least one of the first plate member and the second plate member may pass through each of the assembly parts to fix the discs.

The assembly parts may include hole parts formed through the surface of each of the discs.

The assembly parts may include recess parts formed on the edge of each of the discs.

The first protrusion parts and the second protrusion parts may include a plurality of fine protrusions.

The plurality of assembly parts are formed by cutting the surface of the disc body.

The first and second protrusion parts of the first disc and the first and second protrusion parts of the second disc may be alternately formed in even-numbered regions.

The foregoing and/or other aspects are achieved by providing an air cleaning humidifier including a main body, a tub provided in the main body, an air blower fan generating an air current in the tub, and a disc assembly rotated under the condition that a part of the disc assembly is disposed in the tub, and including at least first and second stacked discs, wherein the first disc includes a ring part, a plurality of assembly parts defined through a surface of the ring part, first protrusion parts protruded from the ring part in a first direction, and second protrusion parts protruded from the ring part in a second direction differing from the first direction, and the first protrusion parts and the second protrusion parts are alternately formed in even-numbered regions, into which each of areas between the respective assembly parts is divided.

The assembly parts may include a first assembly part, a second assembly part, a third assembly part, and a fourth assembly part, which are successively disposed at an angle of approximately 90 degrees, the first protrusion parts may be protruded from regions between the respective first to fourth assembly parts at designated intervals, and the second protrusion parts may be protruded from regions between the respective first to fourth assembly parts, where the first protrusion parts are not protruded.

The assembly parts may include a first assembly part, a second assembly part, and a third assembly part, which are successively disposed at an angle of approximately 120 degrees, the first protrusion parts may be protruded from regions between the respective first to third assembly parts at designated intervals, and the second protrusion parts may be protruded from regions between the respective first to third assembly parts, where the first protrusion parts are not protruded.

The foregoing and/or other aspects are achieved by providing a disc assembly of an air cleaning humidifier, the disc assembly including a disc member formed by stacking at least first and second discs, each of which includes assembly parts defined through parts of the corresponding disc, and first and second plate members respectively disposed at both sides of the disc member to fix the disc member, wherein each of the first and second discs includes a ring part, the plurality of assembly parts defined through the surface of the ring part, first protrusion parts protruded from one surface of the ring part, and second protrusion parts protruded from another surface of the ring part, the first and second protrusion parts of the first disc and the first and second protrusion parts of the second disc are alternately formed in even-numbered regions, into which each of areas of the ring parts between the respective assembly parts is divided, and the first and second protrusion parts of the first disc and the first and second protrusion parts of the second disc are closely adhered to each other, and thus is stacked.

The first and second protrusion parts of the first disc and the first and second protrusion parts of the second disc may be alternately formed in even-numbered regions.

The second protrusion parts may protrude from an opposite surface of the ring part with respect to the one surface.

At least one of the first and second protrusion parts of the second disc may abut against the first disc when the first and second discs are stacked.

When a first assembly part of the first disc corresponds with a first assembly part of the second disc in a first position, and the first disc is rotated with respect to the second disc from the first position to a second position such that the first assembly part of the first disc corresponds with a second assembly part of the second disc, at least one of the protrusion parts of the first disc being alternatively positioned with at least one of the protrusion parts of the second disc when the first disc and the second disc are stacked.

The foregoing and/or other aspects are achieved by providing a disc assembly of an air cleaning humidifier, the disc assembly including: a disc member including at least first and second stacked discs, each of the discs including at least one receiving hole defined through the corresponding disc, each of the first and second discs including a ring part, first protrusion parts protruded from one surface of the ring part, and second protrusion parts protruded from the opposite surface of the ring part, the first and second protrusion parts being alternately formed in even-numbered regions, the at least one receiving hole being defined through at least a portion of a surface of the ring part; and first and second plate members respectively disposed at both sides of the disc member, at least one of the plate members including at least one connection part receivable into the at least one receiving hole and secured at the other of the plate members to maintain the discs of the disc member together, wherein the first and second discs are configured such that when each of the at least one receiving hole of the first disc corresponds with each of the at least one receiving hole of the second disc, at least one of the protrusion parts of the first disc being alternatively positioned with at least one of the protrusion parts of the second disc when the first disc and the second disc are stacked.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
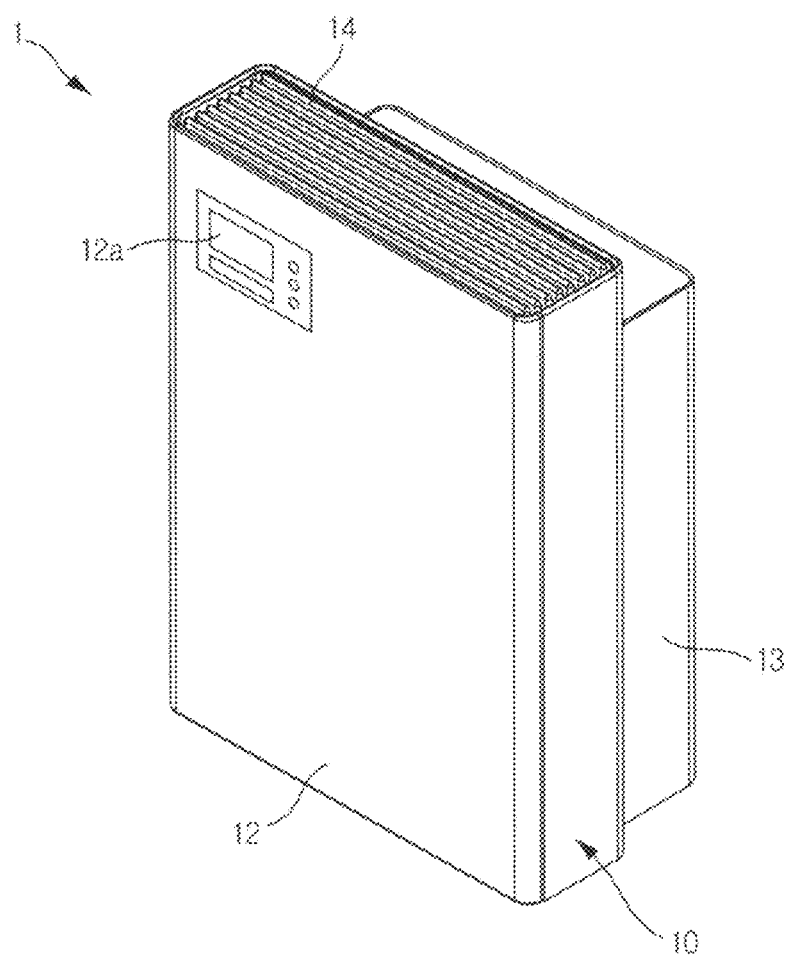
FIG. 1 is a perspective view illustrating the external appearance of an air cleaning humidifier in accordance with at least one embodiment.

Reference will now be made in detail to the at least one embodiment, examples of which are illustrated in the accompanying drawings, wherein like reference numerals refer to like elements throughout.

Hereinafter, at least one embodiment will be described in detail with reference to the accompanying drawings.

Figure 2:
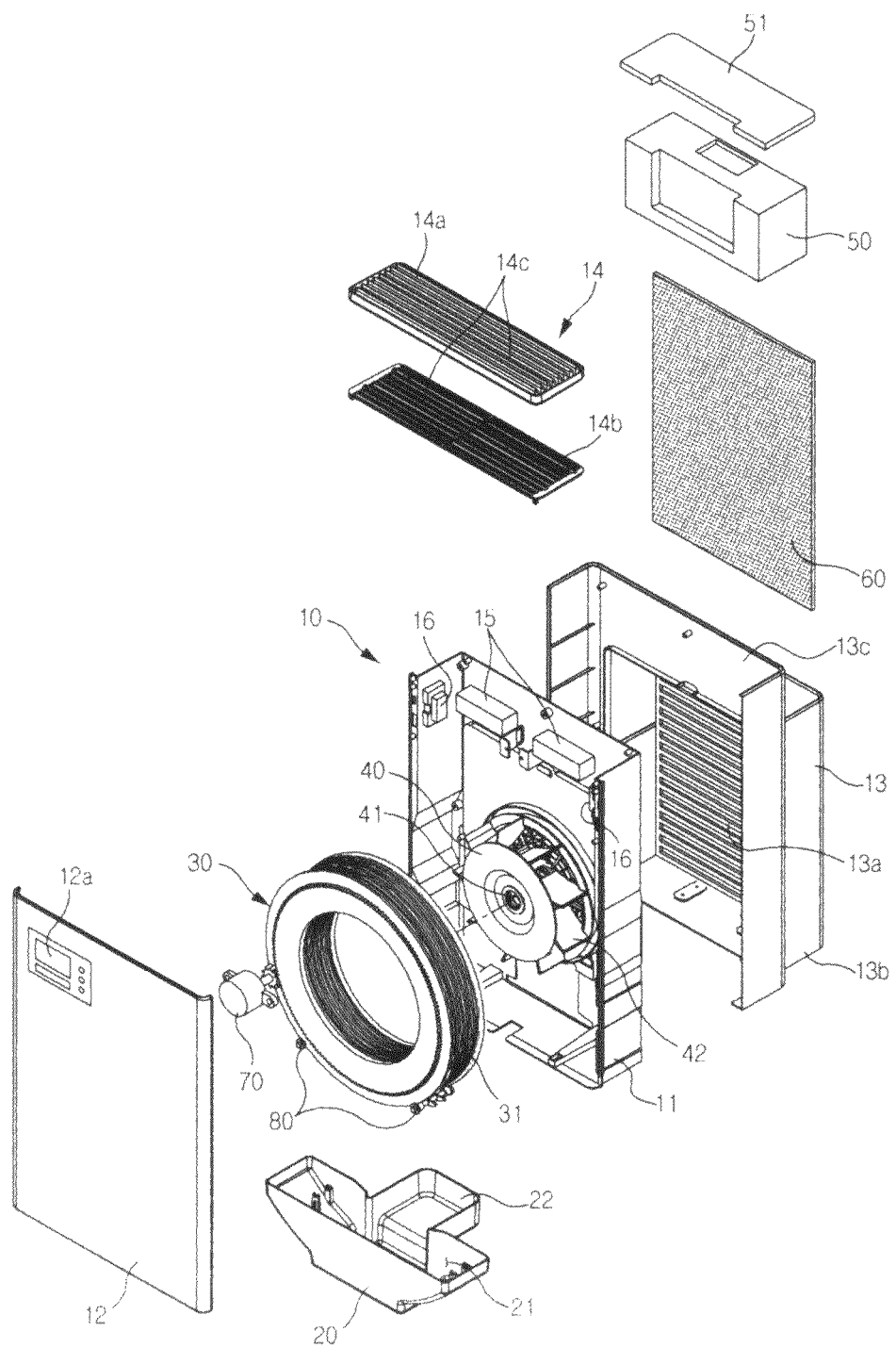
FIG. 2 is an exploded perspective view of the air cleaning humidifier of FIG. 1.

FIG. 1 is a perspective view illustrating the external appearance of an air cleaning humidifier in accordance with at least one embodiment, and FIG. 2 is an exploded perspective view of the air cleaning humidifier of FIG. 1.

As shown in FIGS. 1 and 2, an air cleaning humidifier 1 in accordance with this embodiment includes a main body 10 forming the external appearance of the air cleaning humidifier 1, a tub 20 disposed within the main body 10 to contain water, a disc assembly 30 rotated under the condition that a part of the disc assembly 30 is disposed within the tub 20, and an air blower device 40 to blow air to the disc assembly 30.

The main body 10 includes a main body frame 11, a front cover 12 forming the external appearance of the front surface of the air cleaning humidifier 1, a rear cover 13 forming the external appearance of the rear surface of the air cleaning humidifier 1, and a discharge grill 14 forming air discharge holes 14c on the upper surface of the main body 10.

The main body frame 11 serves as a frame to support the entirety of the air cleaning humidifier 1. Various parts including the tub 20, the disc assembly 30, and the air blower device 40 are installed on the main body frame 11.

The tub 20 is a space to contain water, and a lower part of the disc assembly 30 is partially disposed within a water containing part 21 of the tub 20, and thus is soaked. That is, the disc assembly 30 is soaked in water contained in the water containing part 21 of the main body frame 11. Further, a water supply part 22 to receive water supplied from a water tank, which will be descried later, is provided in the tub 20.

The disc assembly 30 has an approximately ring shape, and a detailed description thereof will be given later.

The air blower device 40 includes an air blower motor 41 to provide a driving force, and an air blower fan 42 to receive the driving force from the air blower motor 41 and to generate a flow of air using the driving force. The air blower fan 42 generates an air current within the air cleaning humidifier 1 so as to inhale air through air suction holes 13a and then to discharge air through the air discharge holes 14c.

Heaters 15 may be installed on the upper portion of the main body frame 11. The heaters 15 serve to heat humidified air discharged to the outside, if necessary, so as to generate warm humidified air.

Further, a sterilization device 16 may be installed on each of both side surfaces of the upper portion of the main body frame 11. The sterilization devices 16 serve to exterminate noxious bacteria in the humidified air so as to discharge clean humidified air to the outside of the air cleaning humidifier 1.

The front cover 12 has an approximately rectangular shape, and is connected to the front surface of the main body frame 11. The external surface of the front cover 12 may be decorated with various pictures or designs. Further, a control part 12a to control operation of the air cleaning humidifier 1 is provided at the upper portion of the front cover 12.

The control part 12a is provided with various buttons, and thus allows a user to operate the air cleaning humidifier 1. The control part 12a may be manipulated in a touch type as well as in a button type, although is not limited thereto and may be manipulated in any type of input mechanism.

The rear cover 13 is connected to the rear surface of the main body frame 11, and includes a water tank receipt part 13b to accommodate a water tank 50. A plurality of air suction holes 13a is formed through the rear cover 13, and dry indoor air is inhaled into the air cleaning humidifier 1 through the air suction holes 13a.

The water tank receipt part 13b protrudes from the rear surface of the rear cover 13 such that the upper surface of the water tank receipt part 13b is opened. An inner cover 13c is installed in the water tank receipt part 13b, and the water tank 50 is accommodated on the inner cover 13c in the water tank receipt part 13b.

The water tank 50 serves to store water necessary for humidification and then to supply a proper amount of the water to the water containing part 21 of the tub 20 via the water supply part 22 of the tub 20, and is mounted on the air cleaning humidifier 1 in a cassette type.

When the water tank 50 is mounted on the air cleaning humidifier 1, the upper surface of the water tank 50 is covered with a water tank cover 51. A filter 60 is installed on the rear inner surface of the water tank receipt part 13b. The filter 60 serves to filter out impurities from air introduced from the outside.

The discharge grill 14 is connected to the upper end of the main body 10, and is provided with the air discharge holes 14c. The discharge grill 14 includes an outer discharge grill part 14a installed on the outer side of the main body 10, and an inner discharge grill part 14b installed on the inner side of the main body 10.

Figure 3:
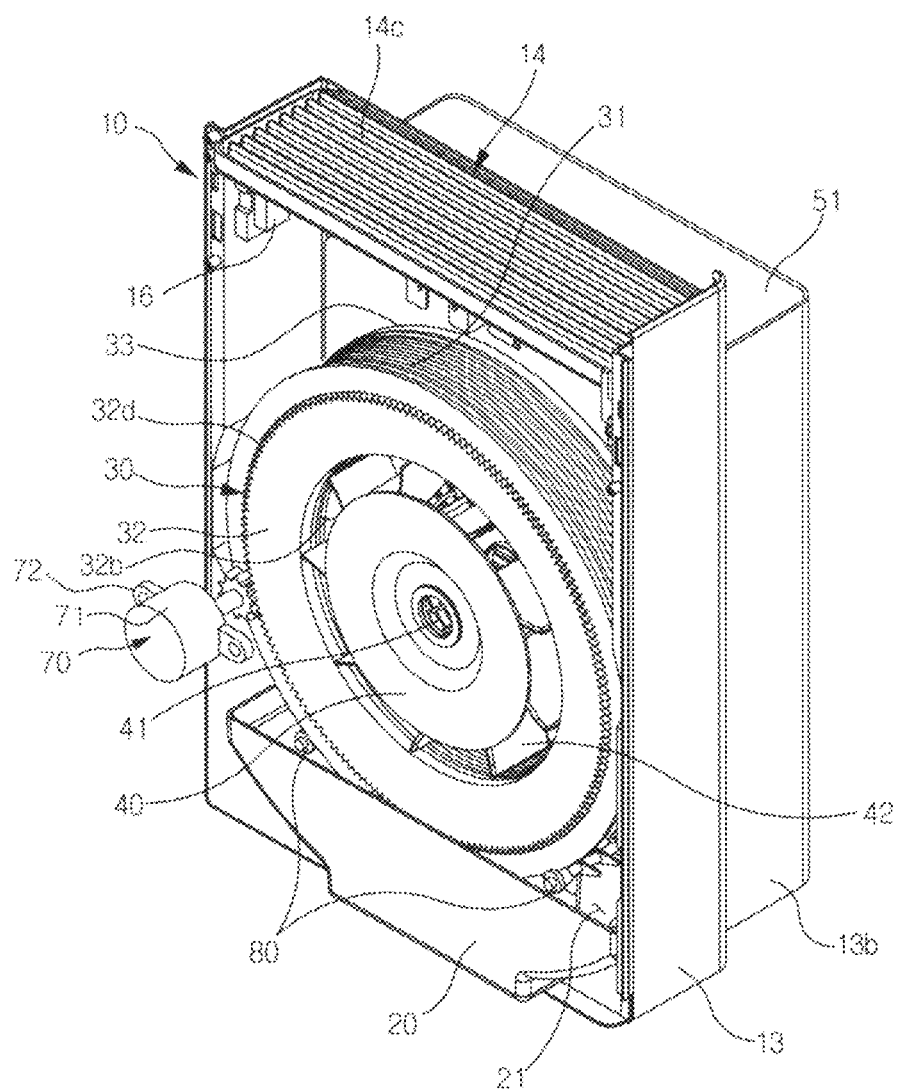
FIG. 3 is a perspective view illustrating the assembly state of a disc assembly in accordance with at least one embodiment.
Figure 4:
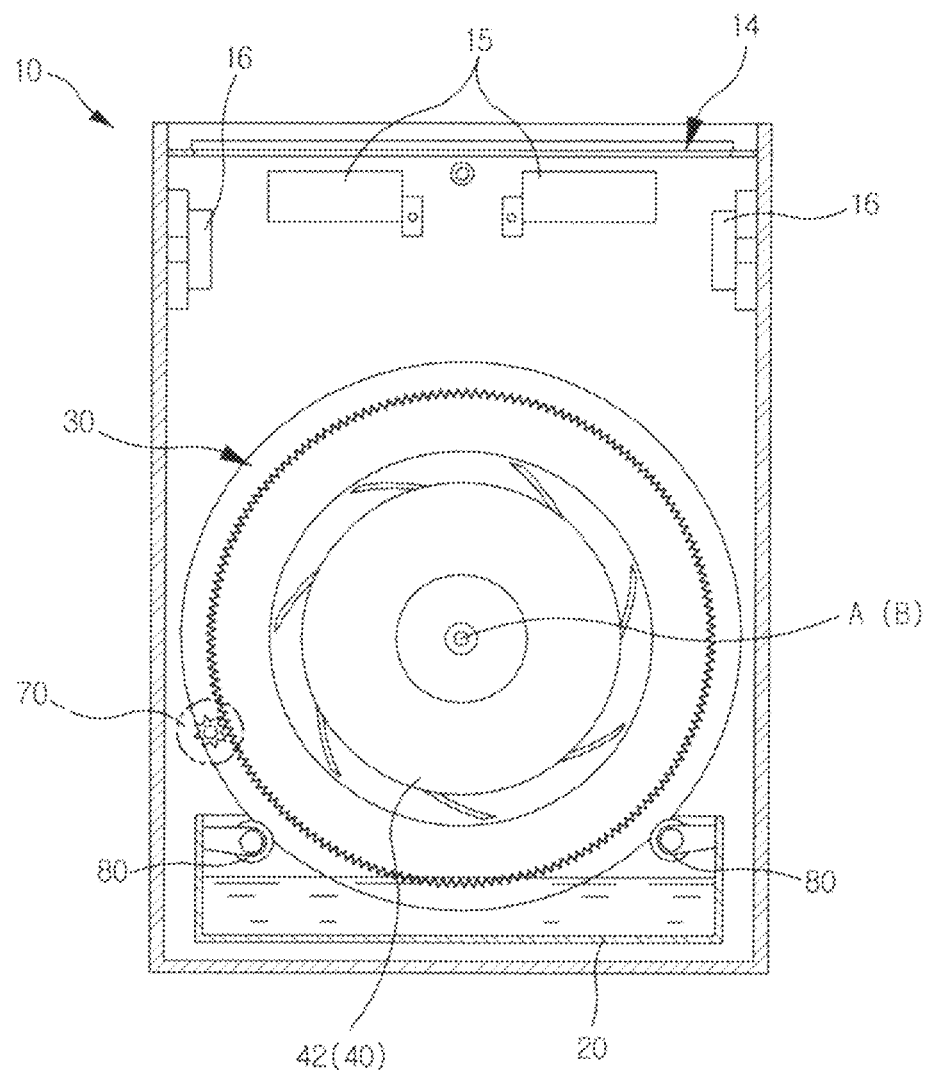
FIG. 4 is a front view of the disc assembly shown in FIG. 3.
Figure 5:
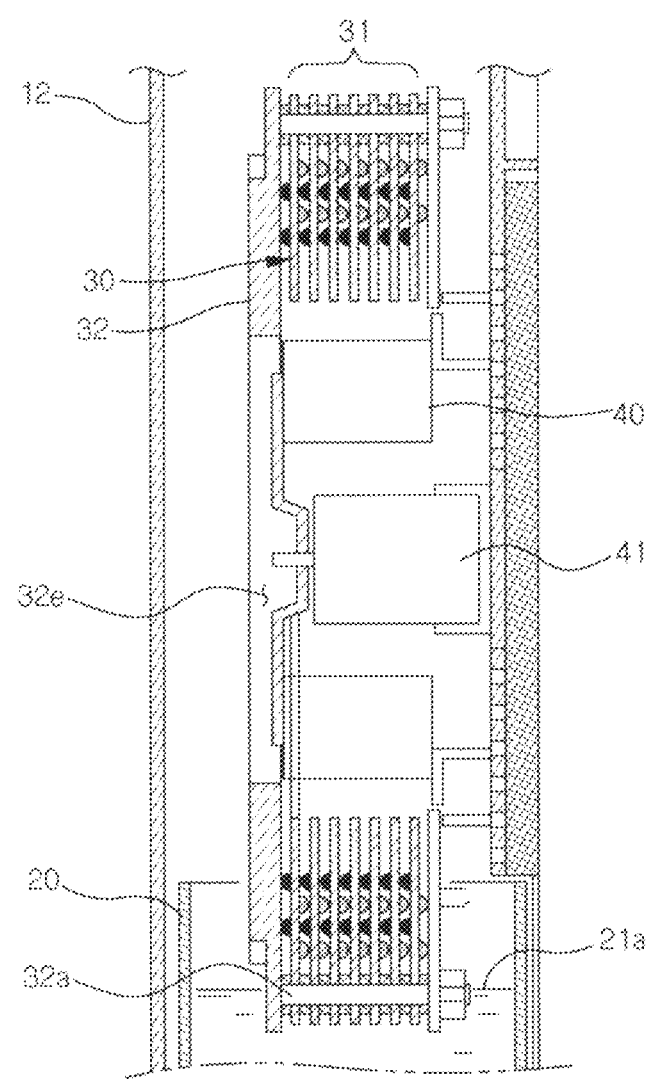
FIG. 5 is a longitudinal-sectional view of the disc assembly shown in FIG. 3.
Figure 6:
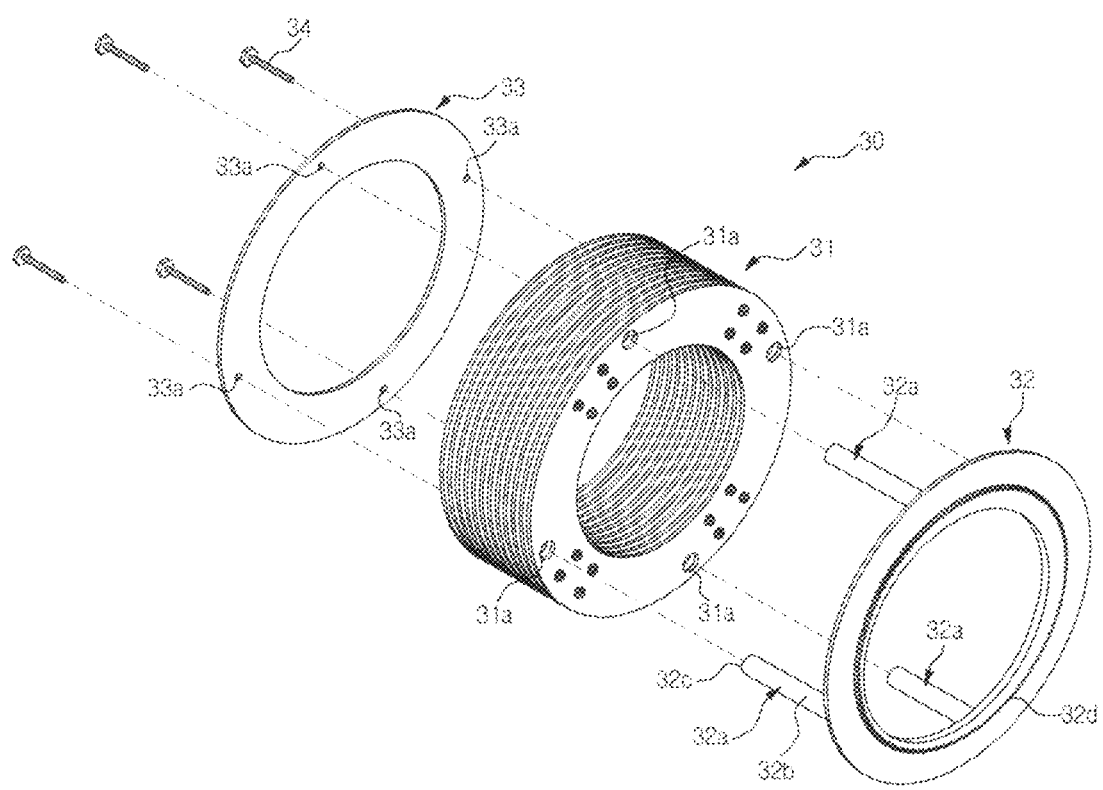
FIG. 6 is an exploded perspective view of the disc assembly shown in FIG. 3.

Next, with reference to FIGS. 3 to 6, a disc assembly in accordance with at least one embodiment will be described. FIG. 3 is a perspective view illustrating the assembly state of a disc assembly in accordance with at least one embodiment, FIG. 4 is a front view of the disc assembly shown in FIG. 3, FIG. 5 is a longitudinal-sectional view of the disc assembly shown in FIG. 3, and FIG. 6 is an exploded perspective view of the disc assembly shown in FIG. 3.

As shown in FIGS. 3 to 6, in the air cleaning humidifier 1 in accordance with at least one embodiment, the disc assembly 30 is disposed to surround the air blower fan 42 such that a center A of rotation of the disc assembly 30 is approximately the same as a center B of rotation of the air blower fan 42. Further, the disc assembly 30 is accommodated in the main body frame 11 such that the disc assembly 30 is overlapped with the air blower fan 42.

The disc assembly 30 includes a disc member 31 assembled by stacking at least two discs, a first plate member 32 disposed at one side of the disc member 31, and a second plate member 33 disposed at the other side of the disc member 31 and connected to the first plate member 32.

The disc member 31 in accordance with at least one embodiment may serve as a humidification element, and may be obtained by stacking several ring-shaped discs. The disc member 31 is approximately ring-shaped, and is provided with assembly parts 31a obtained by cutting parts of the disc member 31 so as to be assembled with the first plate member 32 and the second plate member 33.

The assembly parts 31a of the disc member 31 may include hole parts 31a, each of which is formed at a designated position on the surface of the disc member 31. The hole parts 31a are formed by removing parts of the surface of the disc member 31.

If the assembly parts 31a, such as the hole parts 31a, are formed on the ring-shaped disc member 31, when several disc members 31 are stacked, alignment to stack the disc members 31 may be easy, and when the first plate member 32 is inserted into the disc member 31, the first plate member 32 and the disc member 31 may be simply assembled without delicate manipulation. However, the assembly parts 31a may include recess parts 31b (see FIG. 13) formed by removing parts of the edge of the disc member 31, or may include multiple recess parts 31b and multiple hole parts 31a. A detailed description of the disc member 31 will be given later with reference to FIGS. 7 to 10.

The first plate member 32 is approximately ring-shaped, and includes at least one connection part 32a formed corresponding to the hole parts 31a of the disc member 31.

The connection parts 32a are inserted into the hole parts 31a of the disc member 31, and thus serve to maintain the assembly shape of the disc assembly 30. Each of the connection parts 32a includes a disc member fixing part 32b protruded in the stacking direction of the disc member 31, and a screw connection part 32c formed through the disc member fixing part 32b such that a screw 34, or any other type of fixing device, is connected thereto.

The second plate member 33 includes screw holes 33a formed at positions corresponding to the hole parts 31a of the disc member 31 and the connection parts 32a of the first plate member 32. The screw holes 33a serve as intermediates during a process of connecting the screws 34 to the screw connection parts 32c of the first plate member 32.

The disc assembly 30 is connected to a driving unit 70, which generates rotary force for the disc assembly 30. The driving unit 70 includes a driving motor 71, and a driving gear 72, and the driving gear 72 is connected to a gear part 32d of the first plate member 32.

Driving force of the driving unit 70 is transmitted to the disc assembly 30 by engaging the driving gear 72 of the driving unit 70 with the gear part 32d of the first plate member 32. The driving gear 72 may be located below the center A of rotation of the disc assembly 30. The position of the driving gear 72 above the first plate member 32 prevents interference of the disc assembly 30 with the driving unit 70 when the disc assembly 30 is installed in the air cleaning humidifier 1 or is separated from the air cleaning humidifier 1.

Further, support members 80 to support the disc assembly 30 may be provided in the tub 20. The support members 80 may be detachably disposed at both sides of the inside of the tub 20. The support members 80 are rotatably provided, and serve to guide the disc assembly 30 such that the disc assembly 30 is more stably rotated by the driving gear 72 as well as to support the disc assembly 30.

Hereinafter, a disc member in accordance with at least one embodiment will be described with reference to FIGS. 7 and 8.

Figure 7:
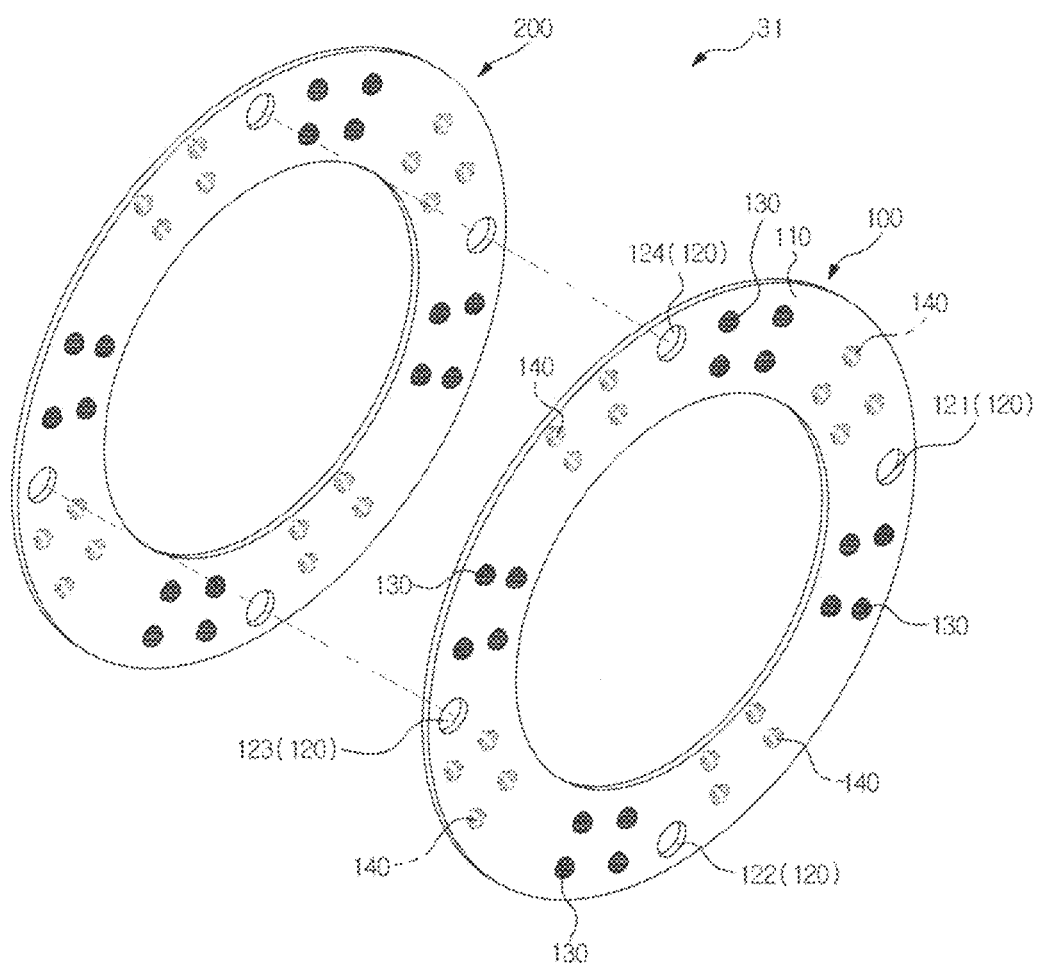
FIG. 7 is an enlarged perspective view of some discs of a disc member in accordance with at least one embodiment.
Figure 8:
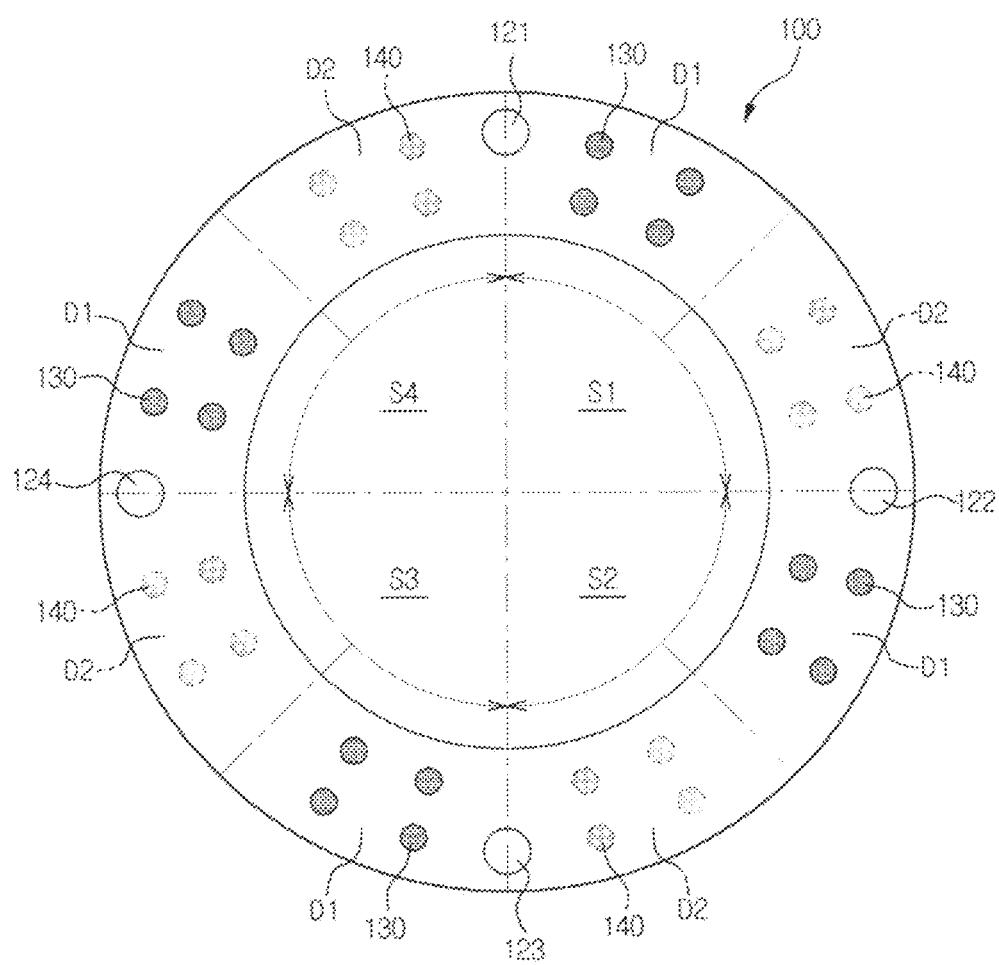
FIG. 8 is an enlarged front view of the discs shown in FIG. 7.

FIG. 7 is an enlarged perspective view of some discs of the disc member in accordance with at least one embodiment, and FIG. 8 is an enlarged front view of the discs shown in FIG. 7.

As shown in FIGS. 7 and 8, the disc member 31 is formed by stacking at least two discs 100 and 200. Among these discs 100 and 200, a disc disposed at the right is referred to as a first disc 100, and a disc disposed at the left is referred to as a second disc 200. The second disc 200 has the same structure as that of the first disc 100, and thus a detailed description thereof will thus be omitted.

The first disc 100 includes a ring-shaped body 110, a plurality of assembly parts 120 formed by cutting the surface of the body 110, first protrusion parts 130 formed on one surface of the body 110, and second protrusion parts 140 formed on the opposite surface of the body 110. Here, the first protrusion parts 130 and the second protrusion parts 140 may include a large number of fine protrusions.

The body 110 is divided into a plurality of sectors S1, S2, S3, and S4 by the plurality of assembly parts 120. For convenience of illustration, among these assembly parts 120 of the first disc 100, an uppermost assembly part is referred to as a first assembly part 121, and the other assembly parts are sequentially referred to as a second assembly part 122, a third assembly part 123, and a fourth assembly part 124 in the clockwise direction from the first assembly part 121. Here, the first assembly part 121, the second assembly part 122, the third assembly part 123, and the fourth assembly part 124 may be disposed on the surface of the body 110 at an angle of approximately 90 degrees, but is not limited thereto.

The sectors S1, S2, S3, and S4 include a first sector S1 formed between the first assembly part 121 and the second assembly part 122, a second sector S2 formed between the second assembly part 122 and the third assembly part 123, a third sector S3 formed between the third assembly part 123 and the fourth assembly part 124, and a fourth sector D4 formed between the fourth assembly part 124 and the first assembly part 121.

Therefore, the first sector S1, the second sector S2, the third sector S3, and the fourth sector S4 having the same size may be disposed at an angle of approximately 90 degrees, although the sectors are not limited thereto. However, approximately 90 degrees corresponds with being within a few degrees of 90 degrees.

The first sector S1 is divided into a first region D1 having the first protrusion part 130 protruded from one surface of the body 110, and a second region D2 having the second protrusion part 140 protruded from the other surface of the body 110. The first region D1 and the second region D2 may have approximately the same size, and may be alternately repeated.

That is, although FIG. 8 illustrates that the first sector S1 is divided into two regions, i.e., one first region D1 having the first protrusion part 130 and one second region D2 having the second protrusion part 140, the number of each of the first regions D1 and the second regions D2 may be respectively two, three, or more. In more detail, the first sector S1 may be divided into even-numbered regions such that one first region D1 having the first protrusion part 130 and one second region D2 having the second protrusion part 140 may be alternately repeated.

Further, the second sector S2, the third sector S3, and the fourth sector S4 may be formed in the same manner as the first sector S1. That is, each of the second sector S2, the third sector S3, and the fourth sector S4 is divided into the first region D1 having the first protrusion part 130 protruded from one surface of the body 110, and the second region D2 having the second protrusion part 140 protruded from the opposite surface of the body 110, and the alternate repetition number of the first region D1 and the second region D2 may be two, three, or more.

Figure 9:
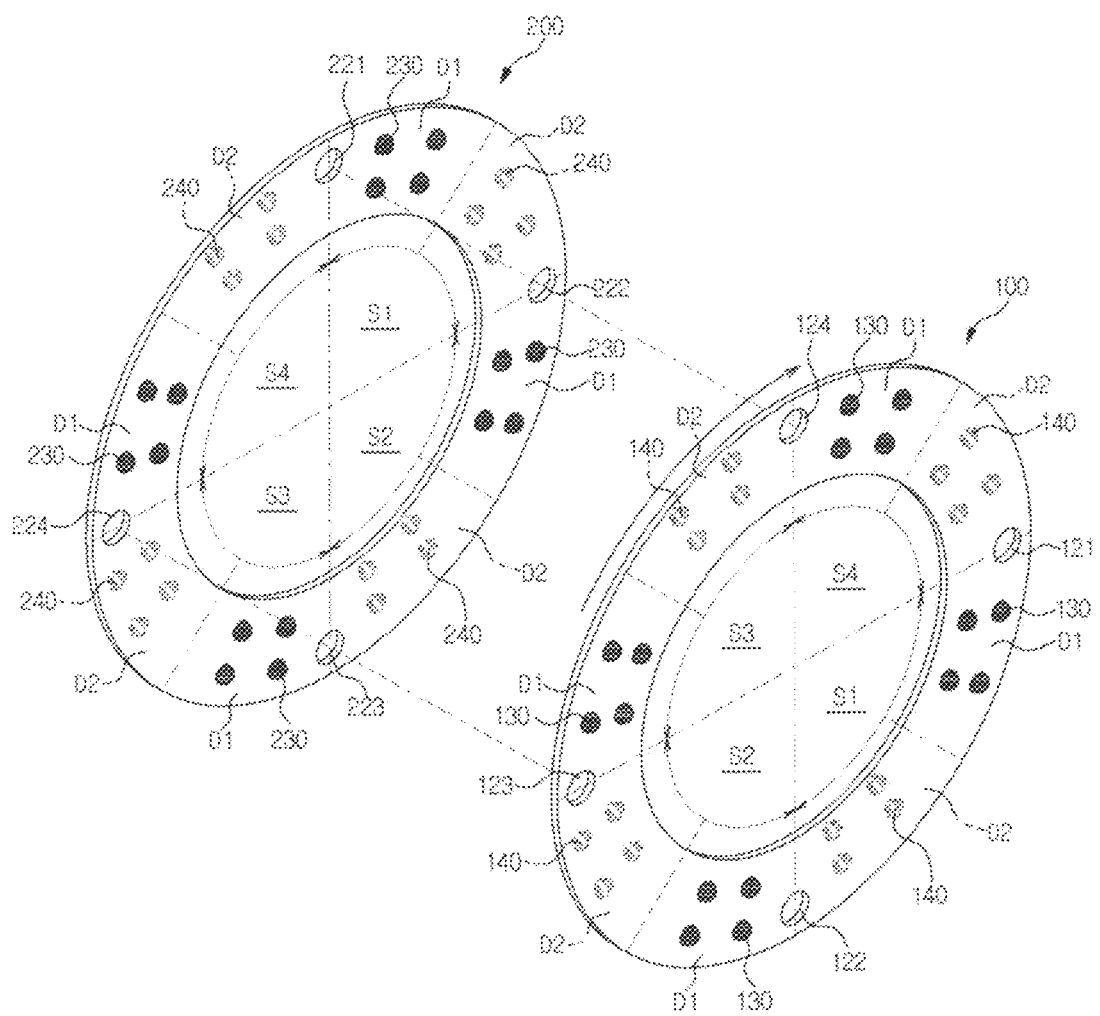
FIG. 9 is a view illustrating stacking of a first disc shown in FIG. 7, which is rotated, with a second disc.

Next, an operation of the disc assembly in accordance with at least one embodiment will be described with reference to FIGS. 9 and 10. FIG. 9 is a view illustrating stacking of the first disc shown in FIG. 7, which is rotated, with the second disc, and FIG. 10 is a view illustrating stacking of the first disc shown in FIG. 7, which is turned inside out, with the second disc.

Figure 10:
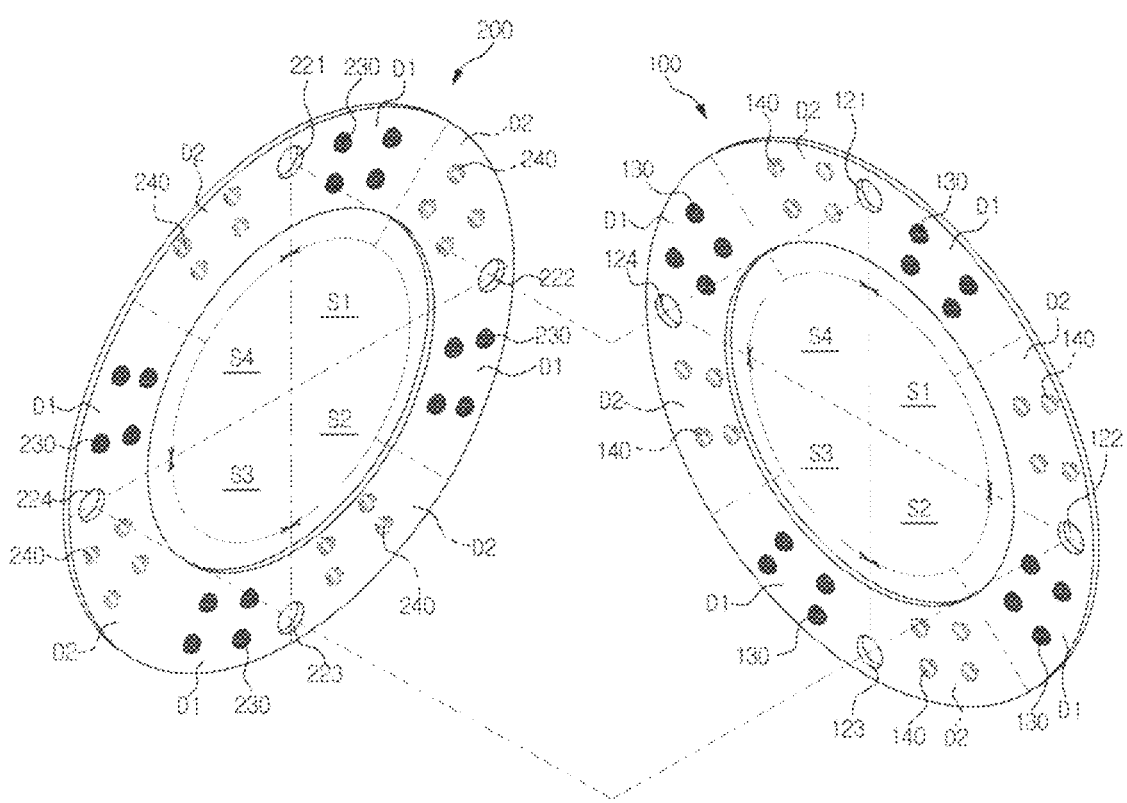
FIG. 10 is a view illustrating stacking of the first disc shown in FIG. 7, which is turned inside out, with the second disc.

As shown in FIGS. 9 and 10, the first disc 100 and the second disc 200 are stacked such that the first to fourth assembly parts 121, 122, 123, and 124 of the first disc 100 respectively coincide with first to fourth assembly parts, 221, 222, 223, and 224 of the second disc 200. The first to fourth assembly parts 121, 122, 123, and 124 of the first disc 100 and the first to fourth assembly parts, 221, 222, 223, and 224 of the second disc 200 are respectively separated from each other at a designated interval under the condition that the first to fourth assembly parts 121, 122, 123, and 124 of the first disc 100 and the first to fourth assembly parts, 221, 222, 223, and 224 of the second disc 200 respectively face each other. Because the first and second protrusion parts 130 and 140 of the first to fourth assembly parts 121, 122, 123, and 124 of the first disc 100 and first and second protrusion parts 230 and 240 of the first to fourth assembly parts 221, 222, 223, and 224 of the second disc 200 are alternately formed respectively, the same interval between the first disc 100 and the second disc 200 is maintained without overlapping each other.

Here, the first disc 100 may rotated at an angle of 90 degrees such that the first assembly part 121 of the first disc 100 coincides with the second assembly part 222 of the second disc 200, thereby being disposed such that the first sector S1 of the first disc 100 faces the second sector S2 of the second disc 200, the second sector S2 of the first disc 100 faces the third sector S3 of the second disc 200, the third sector S3 of the first disc 100 faces the fourth sector S4 of the second disc 200, and the fourth sector S4 of the first disc 100 faces the first sector S1 of the second disc 200.

In this case, the first protrusion part 130 and the second protrusion part 140 alternately formed on the first sector S1 of the first disc 100 are stacked on the first protrusion part 230 and the second protrusion part 240 alternately formed on the second sector S2 of the second disc 200 without overlapping each other. Therefore, the first disc 100 and the second disc 200 may be stably stacked at a designated interval.

In the same manner, the first protrusion part 130 and the second protrusion part 140 alternately formed on the second sector S2 of the first disc 100 are stacked on the first protrusion part 230 and the second protrusion part 240 alternately formed on the third sector S3 of the second disc 200 without overlapping each other, the first protrusion part 130 and the second protrusion part 140 alternately formed on the third sector S3 of the first disc 100 are stacked on the first protrusion part 230 and the second protrusion part 240 alternately formed on the fourth sector S4 of the second disc 200 without overlapping each other, and the first protrusion part 130 and the second protrusion part 140 alternately formed on the fourth sector S4 of the first disc 100 are stacked on the first protrusion part 230 and the second protrusion part 240 alternately formed on the first sector S1 of the second disc 200 without overlapping each other.

If the first disc 100 is rotated at an angle of 180 degrees or 270 degrees as well as if the first disc 100 is rotated at an angle of 90 degrees, the first and second protrusion parts 130 and 140 of the respective first to fourth sectors S1, S2, S3, and S4 of the first disc 100 and the first and second protrusion parts 230 and 240 of the respective first to fourth sectors S1, S2, S3, and S4 of the second disc 200 may be stacked at a designated interval without overlapping each other.

On the other hand, the first disc 100 may be turned inside out such that the first assembly part 121 of the first disc 100 coincides with the first assembly part 221 of the second disc 200, thereby being disposed such that the first sector S1 of the first disc 100 faces the fourth sector S4 of the second disc 200, the second sector S2 of the first disc 100 faces the third sector S3 of the second disc 200, the third sector S3 of the first disc 100 faces the second sector S2 of the second disc 200, and the fourth sector S4 of the first disc 100 faces the first sector S1 of the second disc 200.

Even in this case, in the same manner as if the first disc 100 is rotated, the first protrusion part 130 and the second protrusion part 140 alternately formed on the first sector S1 of the first disc 100 are stacked on the first protrusion part 230 and the second protrusion part 240 alternately formed on the fourth sector S4 of the second disc 200 without overlapping each other. Therefore, the first disc 100 and the second disc 200 may be stably stacked at a designated interval. Accordingly, when the disc member 31 is assembled by stacking, the disc member 31 may be easily assembled without consideration of directionality.

Figure 11:
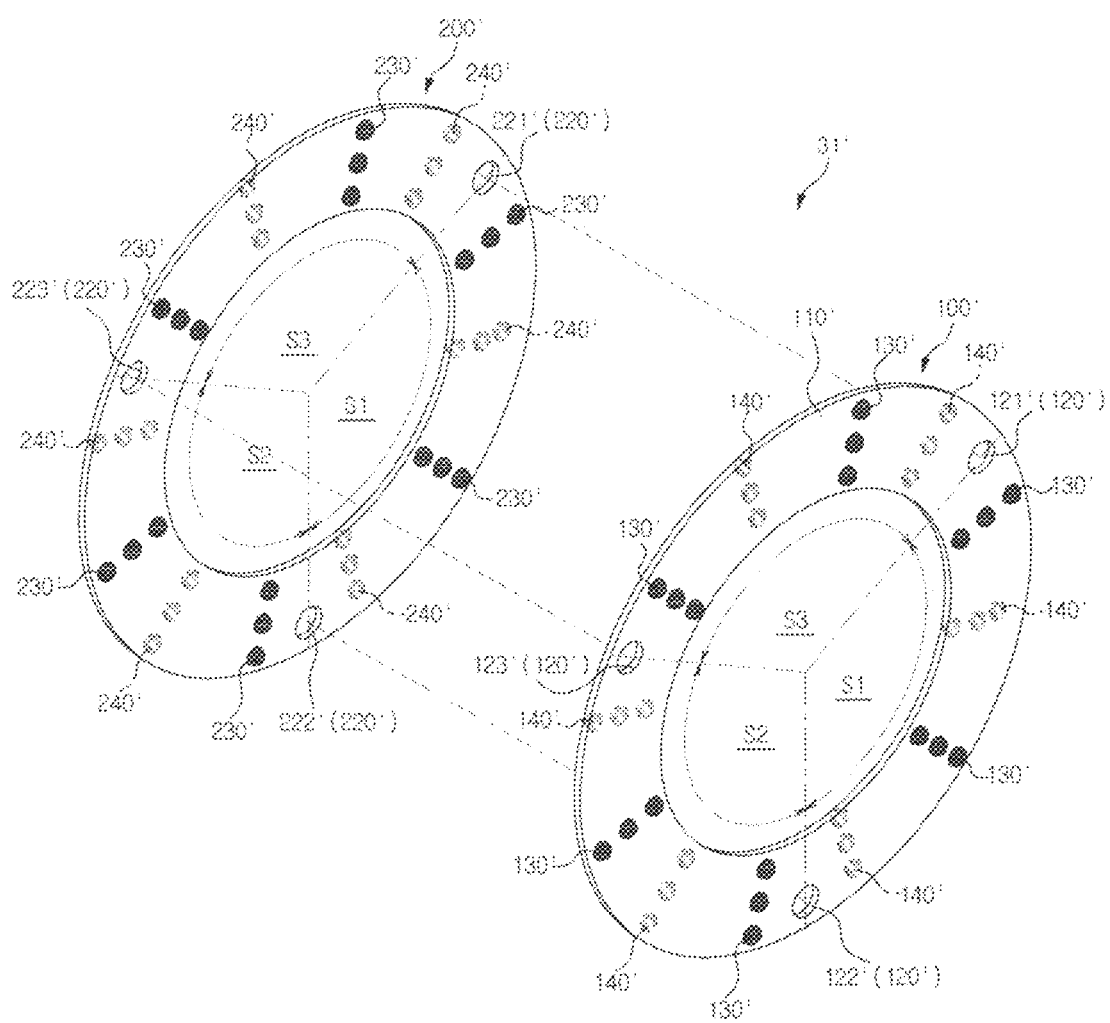
FIG. 11 is an enlarged perspective view of some discs of a disc member in accordance with at least one embodiment.

Hereinafter, at least one embodiment will be described with reference to FIGS. 11 and 12. Some parts in this embodiment, which are substantially the same as those in the former embodiment, are denoted by the same reference numerals even though they are depicted in different drawings, and a detailed description thereof will thus be omitted. FIG. 11 is an enlarged perspective view of some discs of a disc member in accordance with at least one embodiment, and FIG. 12 is an enlarged front view of the discs shown in FIG. 11.

Figure 12:
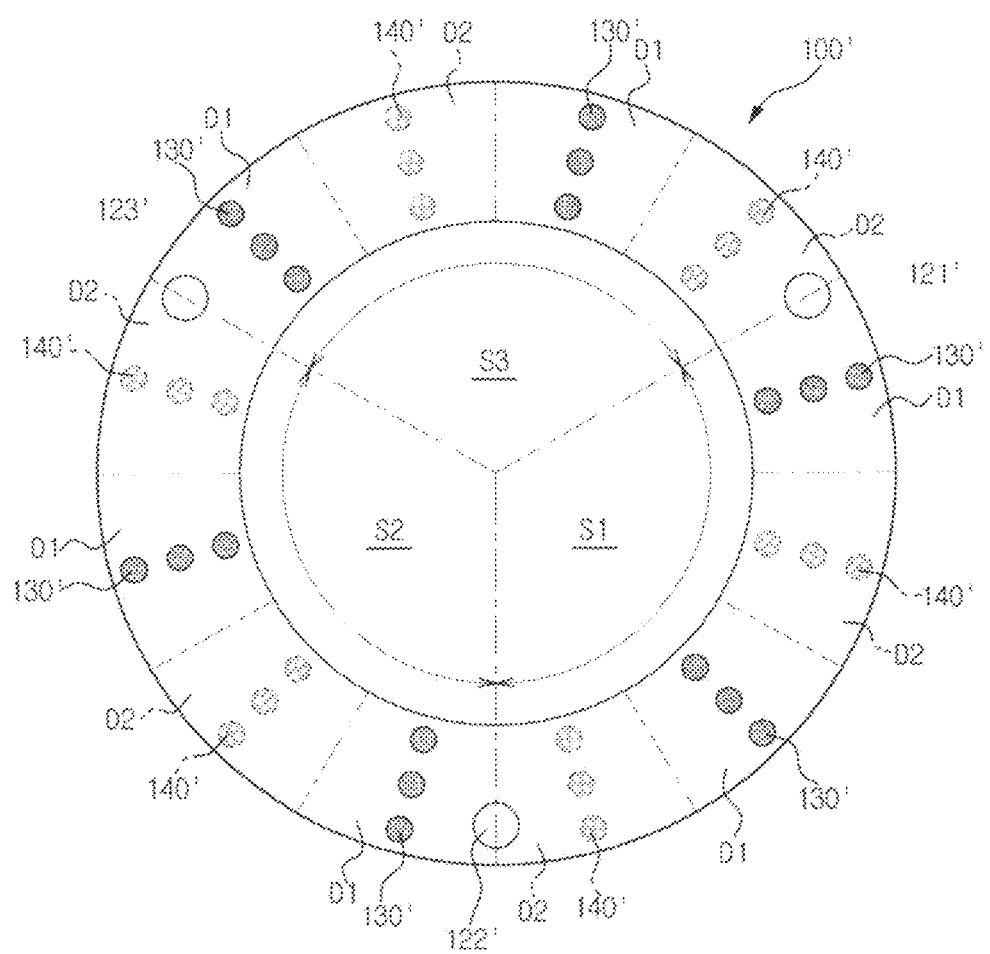
FIG. 12 is an enlarged front view of the discs shown in FIG. 11.

As shown in FIGS. 11 and 12, a disc member 31' in accordance with at least one embodiment is formed by stacking at least two discs 100' and 200'.

A ring part 110' of the first disc 100' is divided into a plurality of sectors S1, S2, and S3 by the plurality of assembly parts 120'. For convenience of illustration, among assembly parts 120' of the first disc 100', an uppermost assembly part is referred to as a first assembly part 121', and the other assembly parts are sequentially referred to as a second assembly part 122' and a third assembly part 123' in the clockwise direction from the first assembly part 121'.

The sectors S1, S2, and S3 include a first sector S1 formed between the first assembly part 121' and the second assembly part 122', a second sector S2 formed between the second assembly part 122' and the third assembly part 123', and a third sector S3 formed between the third assembly part 123' and the first assembly part 121'. Here, the first sector S1, the second sector S2, and the third sector S3 may be disposed on the surface of the ring part 110' at an angle of approximately 120 degrees, but is not limited thereto. However, approximately 120 degrees corresponds with being within a few degrees of 120 degrees.

The first sector S1 is divided into a first region D1 having a first protrusion part 130' protruded from a first surface in a first direction of the ring part 110', and a second region D2 having a second protrusion part 140' protruded from a second surface in a second direction of the ring part 110' opposite from the first direction, and the first region D1 and the second region D2 are alternately repeated twice. However, in the same manner as the former embodiment, in this embodiment, the first sector S1 is divided into even-numbered regions, and in these regions, two regions, i.e., one first region D1 having the first protrusion part 130' and one second region D2 having the second protrusion part 140', are alternately repeated. The alternate repetition number of the first region D1 and the second region D2 is not limited. Further, in the same manner as the former embodiment, in this embodiment, the second sector S2 and the third sector S3 may be formed in the same manner as the first sector S1.

Here, the first disc 100' may be rotated at an angle of 120 degrees such that the first assembly part 121' of the first disc 100 coincides with a second assembly part 222' of the assembly parts 220' of the second disc 200', thereby being disposed such that the first sector S1 of the first disc 100' faces the second sector S2 of the second disc 200', the second sector S2 of the first disc 100' faces the third sector S3 of the second disc 200', and the third sector S3 of the first disc 100' faces the first sector S1 of the second disc 200'.

In this case, the first protrusion part 130' and the second protrusion part 140' alternately formed on the first sector S1 of the first disc 100' are stacked on a first protrusion part 230' and a second protrusion part 240' alternately formed on the second sector S2 of the second disc 200' without overlapping each other. Therefore, the first disc 100' and the second disc 200' may be stably stacked at a designated interval. Further, the first and second protrusion parts 130' and 140' of the respective second and third sectors S2 and S3 of the first disc 100' and the first and second protrusion parts 230' and 240' of the respective third and first sectors S3 and S1 of the second disc 200' may be stacked at a designated interval without overlapping each other.

Not only if first disc 100' is rotated at an angle of 120 degrees, but also if the first disc 100' is rotated at an angle of 240 degrees, the first and second protrusion parts 130' and 140' of the respective first to third sectors S1, S2, and S3 of the first disc 100' and the first and second protrusion parts 230' and 240' of the respective first to third sectors S1, S2, and S3 of the second disc 200' may be stacked at a designated interval without overlapping each other. Accordingly, when the disc member 31' is assembled by stacking, the disc member 31' may be easily assembled without consideration of directionality.

Figure 13:
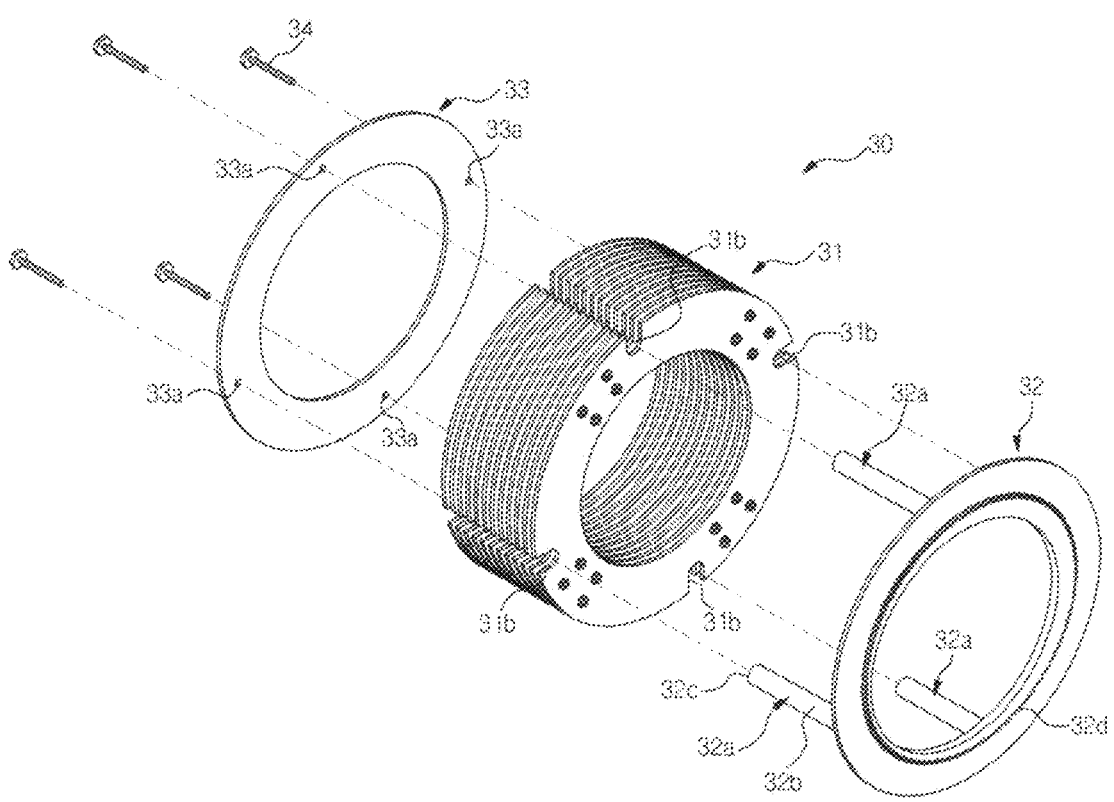
FIG. 13 is an exploded perspective view of at least one embodiment of the disc assembly shown in FIG. 3.

FIG. 13 shows at least one embodiment of the disc assembly including recess parts 31b formed on the edge of the disc members 31. All other reference numbers are similar to those shown in FIG. 6.

Now, the air cleaning humidifier 1 in accordance with at least one embodiment will be described with reference to FIGS. 2 to 5.

First, water stored in the water tank 50 of the air cleaning humidifier 1 is supplied to the tub 20. The water supplied from the water tank 50 is stored in the water containing part 21 via the water supply part 22. Here, the amount of the water in the water containing part 21 may be adjusted such that the water reaches a designated water level 21a (see FIG. 5, for example). Further, a part of the ring-shaped disc assembly 30 is located under the water level 21a in the tub 21, and thus is soaked in the water in the tub 21.

When a user selects an air cleaning and humidification mode through the control part 12a, the air blower fan 42 and the disc assembly 30 are simultaneously driven, and cleaned air is discharged from the air discharge holes 14c via the disc assembly 30 to the outside.

Now, a process of performing the air cleaning and humidification mode will be described in detail. The driving force generated from the driving unit 70 is transmitted from the driving gear 72 to the disc assembly 30, and thus the disc assembly 30 is rotated.

Further, since the air blower fan 42 is inserted into an opening 32e (see FIG. 5, for example) of the ring-shaped first plate member 32, the disc assembly 30 is rotated around the air blower fan 42. The rotation of the air blower fan 42 generates an air current in the air cleaning humidifier 1. Through such an air current, air is inhaled into the air cleaning humidifier 1 through the air suction holes 13a formed through the rear surface of the air cleaning humidifier 1, is inhaled to the air blower fan 42 via the filter 60, passes through the disc assembly 30, and then is discharged to the outside.

That is, the air blower fan 42 and the disc member 31 are overlapped with each other, and thus the air current discharged from the air blower fan 42 is blown to the disc assembly 30. While the blown air passes through the disc member 31, water held by the disc member 31 is evaporated. The obtained humidified air is discharged from the main body 10 to the outside through the air discharge holes 14c.

As is apparent from the above description, in an air cleaning humidifier and a disc assembly thereof in accordance with at least one embodiment, a body of each of discs of a disc member is divided into a plurality of sectors by a plurality of assembly parts, and each of the sectors is divided into even-numbered regions such that protrusion parts protruding from opposite surfaces of the disc member are alternately disposed in these regions, thereby allowing the disc member to be easily assembled by stacking.

Although at least one embodiment has been shown and described, it would be appreciated by those skilled in the art that changes may be made in these embodiments without departing from the principles and spirit of the invention, the scope of which is defined in the claims and their equivalents.

What is claimed is:

1. An air cleaning humidifier, comprising:
a main body;
a tub provided in the main body;
an air blower fan generating an air current in the tub; and
a disc assembly including a plurality of stacked discs, a part of the disc assembly being disposed in the tub, each of at least two of the stacked discs including a body, a plurality of assembly parts defined through the surface of the disc body, first protrusion parts protruding from one surface of the disc body, and second protrusion parts protruding from an other surface of the disc body, the disc body being divided into a plurality of sectors by the plurality of assembly parts, the first protrusion parts and the second protrusion parts being alternately formed in regions, into which each of the plurality of sectors is divided.

2. The air cleaning humidifier according to claim 1, wherein the plurality of sectors is disposed at the same angle.

3. The air cleaning humidifier according to claim 1, wherein the plurality of regions has a same size.

4. The air cleaning humidifier according to claim 1, wherein the one surface of the disc body and the other surface of the disc body are surfaces of the body opposite one another.

5. The air cleaning humidifier according to claim 1, wherein the disc body includes a ring-shaped ring part.

6. The air cleaning humidifier according to claim 1, wherein:
the assembly parts include a first assembly part, a second assembly part, a third assembly part, and a fourth assembly part, which are successively disposed at an angle of approximately 90 degrees;
the sectors include a first sector formed between the first assembly part and the second assembly part, a second sector formed between the second assembly part and the third assembly part, a third sector formed between the third assembly part and the fourth assembly part, and a fourth sector formed between the fourth assembly part and the first assembly part; and
each of the first to fourth sectors is divided into a first region having the first protrusion part and a second region having the second protrusion part.

7. The air cleaning humidifier according to claim 1, wherein:
the assembly parts include a first assembly part, a second assembly part, and a third assembly part, which are successively disposed at an angle of approximately 120 degrees;
the sectors include a first sector formed between the first assembly part and the second assembly part, a second sector formed between the second assembly part and the third assembly part, and a third sector formed between the third assembly part and the first assembly part; and
each of the first to third sectors is divided into a first region having the first protrusion part and a second region having the second protrusion part.

8. The air cleaning humidifier according to claim 6, wherein sizes of the first region and the second region of the first sector are the same as those of the first region and the second region of each of the second to fourth sectors.

9. The air cleaning humidifier according to claim 7, wherein sizes of the first region and the second region of the first sector are the same as those of the first region and the second region of each of the second and third sectors.

10. The air cleaning humidifier according to claim 1, wherein:
the disc assembly further includes a first plate member and a second plate member disposed at opposing sides of the discs; and
at least one of the first plate member and the second plate member passes through each of the assembly parts to fix the discs together.

11. The air cleaning humidifier according to claim 1, wherein the assembly parts include hole parts defined through the surface of each of the discs.

12. The air cleaning humidifier according to claim 1, wherein the assembly parts include recess parts formed on the edge of each of the discs.

13. The air cleaning humidifier according to claim 1, wherein the first protrusion parts and the second protrusion parts include a plurality of fine protrusions.

14. The air cleaning humidifier according to claim 1, wherein the plurality of assembly parts is formed by cutting parts of the disc body.

15. The air cleaning humidifier according to claim 1, wherein the first and second protrusion parts are alternatively formed in even-numbered regions.

16. An air cleaning humidifier, comprising:
- a main body;
- a tub provided in the main body;
- an air blower fan generating an air current in the tub; and
- a rotatable disc assembly having a portion of the disc assembly being disposed in the tub, and including at least first and second stacked discs, the first and second discs each including a ring part, a plurality of assembly parts defined through at least a portion of the ring part, first protrusion parts protruding from the ring part in a first direction, and second protrusion parts protruding from the ring part in a second direction differing from the first direction the first protrusion parts and the second protrusion parts being alternately formed in regions, into which each of areas between the respective assembly parts is divided.

17. The air cleaning humidifier according to claim 16, wherein:
- the assembly parts include a first assembly part, a second assembly part, a third assembly part, and a fourth assembly part, which are successively disposed at an angle of approximately 90 degrees; and
- the first protrusion parts protrude from regions between the respective first to fourth assembly parts at designated intervals, and the second protrusion parts protrude from regions between the respective first to fourth assembly parts.

18. The air cleaning humidifier according to claim 16, wherein:
- the assembly parts include a first assembly part, a second assembly part, and a third assembly part, which are successively disposed at an angle of approximately 120 degrees; and
- the first protrusion parts protrude from regions between the respective first to third assembly parts at designated intervals, and the second protrusion parts protrude from regions between the respective first to third assembly parts.

19. The air cleaning humidifier according to claim 16, wherein the first and second protrusion parts are alternatively formed in even-numbered regions.

20. A disc assembly of an air cleaning humidifier, the disc assembly comprising:
- a disc member including at least first and second stacked discs, each of the discs including assembly parts defined through the corresponding disc, each of the first and second discs including a ring part, first protrusion parts protruding from one surface of the ring part, and second protrusion parts protruding from another surface of the ring part, the plurality of assembly parts being defined through at least a portion of a surface of the ring part, the first and second protrusion parts of the first disc and the first and second protrusion parts of the second disc being alternately formed in regions, into which each of areas of the ring parts between the respective assembly parts is divided, at least one of the first and second protrusion parts of the first disc abutting against the second disc when the first and second discs are stacked; and
- first and second plate members respectively disposed at both sides of the disc member to fix the disc member.

21. The disc assembly according to claim 20, wherein the second protrusion parts protrude from an opposite surface of the ring part with respect to the one surface.

22. The disc assembly according to claim 20, wherein at least one of the first and second protrusion parts of the second disc abut against the first disc when the first and second discs are stacked.

23. The disc assembly according to claim 20, wherein when a first assembly part of the first disc corresponds with a first assembly part of the second disc in a first position, and the first disc is rotated with respect to the second disc from the first position to a second position such that the first assembly part of the first disc corresponds with a second assembly part of the second disc, at least one of the protrusion parts of the first disc being alternatively positioned with at least one of the protrusion parts of the second disc when the first disc and the second disc are stacked.

24. A disc assembly of an air cleaning humidifier, the disc assembly comprising:
- a disc member including at least first and second stacked discs, each of the discs including at least one receiving hole defined through the corresponding disc, each of the first and second discs including a ring part, first protrusion parts protruded from one surface of the ring part, and second protrusion parts protruded from the opposite surface of the ring part, the first and second protrusion parts being alternately formed in regions, the at least one receiving hole being defined through at least a portion of a surface of the ring part; and
- first and second plate members respectively disposed at both sides of the disc member, at least one of the plate members including at least one connection part receivable into the at least one receiving hole and secured at the other of the plate members to maintain the discs of the disc member together,
- wherein the first and second discs are configured such that when each of the at least one receiving hole of the first disc corresponds with each of the at least one receiving hole of the second disc, at least one of the protrusion parts of the first disc being alternatively positioned with at least one of the protrusion parts of the second disc when the first disc and the second disc are stacked.

* * * * *

UNITED STATES PATENT AND TRADEMARK OFFICE
CERTIFICATE OF CORRECTION

PATENT NO. : 8,459,616 B2  Page 1 of 1
APPLICATION NO. : 12/923651
DATED : June 11, 2013
INVENTOR(S) : Jung Ho Kim et al.

It is certified that error appears in the above-identified patent and that said Letters Patent is hereby corrected as shown below:

Title Page: Item 75:

Line 1, Column 1, (Inventors), Delete "Eul" and insert -- Eui --, therefor.

In the Claims:

Line 62, Column 11, In Claim 1, delete "an other" and insert -- another --, therefor.

Signed and Sealed this
Eighth Day of October, 2013

Teresa Stanek Rea
*Deputy Director of the United States Patent and Trademark Office*